United States Patent [19]
Siirtola

[11] 3,854,571
[45] Dec. 17, 1974

[54] SCOOP BELT CONVEYOR

[76] Inventor: Esko Eemeli Siirtola, 39700 Parkano, Finland

[22] Filed: Oct. 20, 1972

[21] Appl. No.: 299,309

[30] Foreign Application Priority Data
Oct. 27, 1971 Finland .................................... 3045

[52] U.S. Cl. ................. 198/162, 198/129, 198/165
[51] Int. Cl. ............................................. B65g 15/10
[58] Field of Search .......... 198/194, 196, 197, 198, 198/199, 129

[56] References Cited
UNITED STATES PATENTS
| | | | |
|---|---|---|---|
| 1,162,270 | 11/1915 | Wiemer | 198/194 |
| 1,833,874 | 11/1931 | Griffith | 198/198 |
| 3,288,296 | 11/1966 | Hirs | 198/194 |

FOREIGN PATENTS OR APPLICATIONS
| | | | |
|---|---|---|---|
| 650,490 | 9/1937 | Germany | 198/199 |

Primary Examiner—Evon C. Blunk
Assistant Examiner—Jeffrey V. Nase
Attorney, Agent, or Firm—Mason, Kolehmainen, Rathburn & Wyss

[57] ABSTRACT

There is provided an endless belt conveyor for transporting material wherein the endless belt has one run thereof slideably supported on a stationary base. A moving chain conveyor is driven independently of the endless belt and is provided with a plurality of transversal conveying means moving over the run of the endless belt. Thus the material to be transported is supported on the endless belt by the stationary base and is moved along by the chain conveyor.

1 Claim, 1 Drawing Figure

PATENTED DEC 17 1974
3,854,571
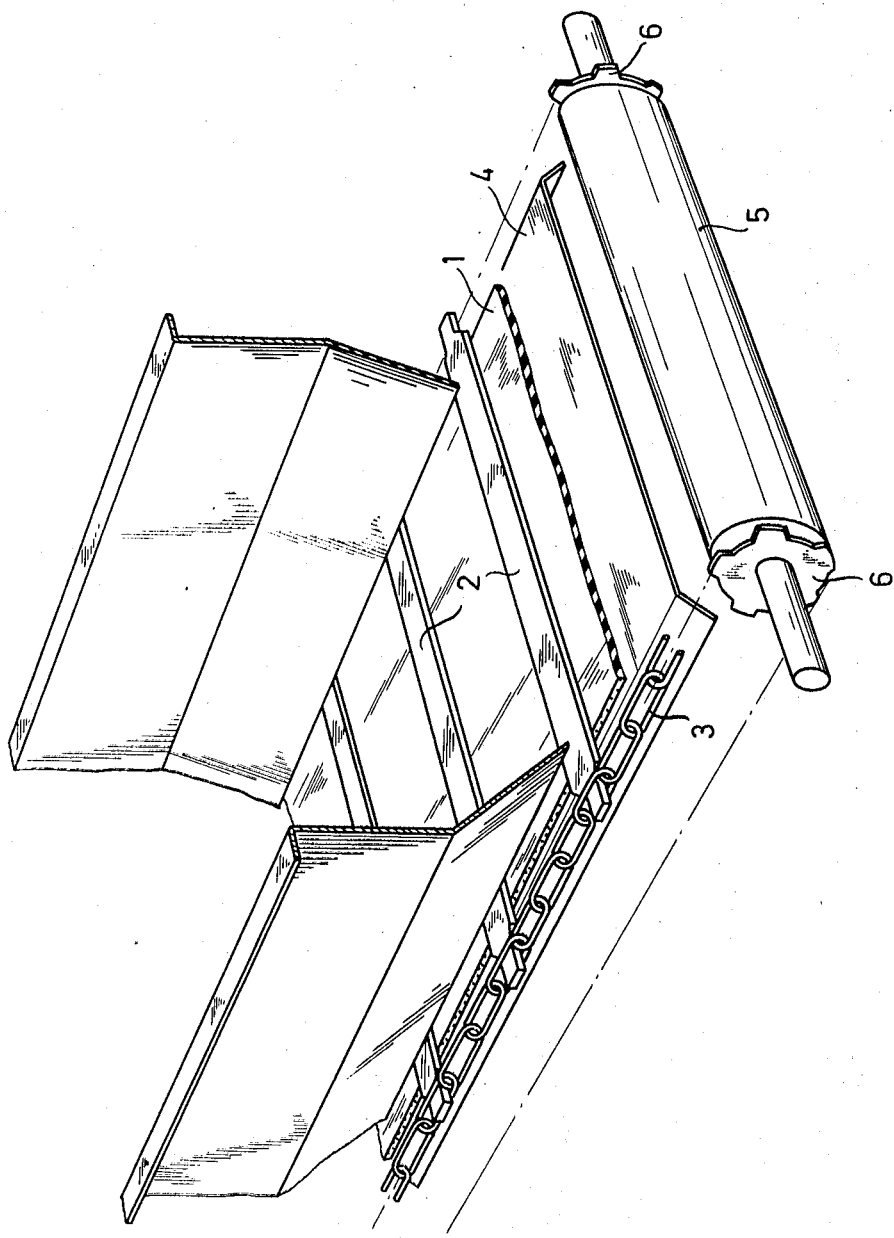

SCOOP BELT CONVEYOR

The present invention concerns a scoop belt conveyor wherein the material to be transported is transported by means of transversal conveying means or so-called scoops attached to chains moving along an endless path and which scoops are moved forward by the chains, the material to be transported being supported by a stationary sliding base.

The aim of the invention is to accomplish a conveyor which is better than heretofore appropriate for transporting in particular heavy, fine-grained as well as blasted rock-like, abrasive materials with high capacity. In addition, the conveyor is also intended to be used as a silo discharger for various materials.

Prior art includes, on one hand, dragging chain scoop conveyors in which the transversal conveying means or scoops moved forward by chains scrape against a stationary supporting base or bottom plate and, on the other hand, belt conveyors which usually have no scoops, although for certain applications it is known in prior art to use, either on the belt itself or in association with a conventional belt conveyor provided with a system of supporting rolls, various elements preventing slipping of the material.

It is a major drawback of existing chain scoop conveyors that the scoops and the bottom plate are susceptible to wear. The primary drawback of belt conveyors, again, is the fact that the life span of the belt is curtailed by the requisite tension acting on the belt.

In a scoop belt conveyor of the above-mentioned type according to the invention, these drawbacks have been eliminated by virtue of that characteristic of the invention that between the smooth upper surface of the stationary sliding base and the scoops there has been disposed an endless belt mainly carried along by the material to be transported.

Hereby the advantage is gained over chain scoop conveyors of prior art that the scoops and the bottom plate are not subject to wear. The advantages which are gained over belt conveyors of prior art include elimination of the tensile stress acting on the belt virtually in its entirety, smaller diameters of the end drums, whereby little space is required, and elimination of supporting roll systems, which require servicing. As a consequence of the advantages mentioned, one achieves a long life span of the apparatus according to the invention, high transporting capacities with low energy consumption, steep angles of ascent, small space requirements in the vertical direction, in addition to which the price is moderate.

In the following, the invention is described with reference to the attached drawing, which shows, in perspective and partly cut open, an embodiment example of a scoop belt conveyor according to the present invention.

The prinicpal components of the scoop belt conveyor shown in the drawing are: an endless belt 1, which consists of steel, rubber or equivalent, transversal conveying means or scoops 2, chains 3 which move the scoops forward, a stationary, smooth bottom plate 4, an end roll 5 for the belt, and sprocket wheels 6. The stationary bottom plate 4 constitutes a supporting base for the material to be transported. The belt 1 slides along the smooth plate bottom 4 and the materials have been chosen so as to make the coefficient of friction between them as small as possible.

Upon the belt 1, detached from the same, are the transversal transporting scoops 2, which are moved forward by the chains 3. The chains 3 pass over sprocket wheels 6, which in this case have been shown as riding on the same shaft as the belt drum 5.

The actual forward transportation of the material is by means of the sprocket wheels 6, chains 3 and scoops 2, and the belt may in this connection be freely carried along by the material that is being transported. It is thus understood that the speed of the belt is the same or slightly slower than that of the scoops 2, depending on the direction of transport and on the kind of material to be transported. When a common end roll is used in which the sprocket wheels 6 and belt drum 5 have been disposed on the same shaft, it is advantageous to arrange the load to be borne by the scoops 2 altogether, in that the belt drum 5 is freely rotatably disposed between the sprocket wheels 6.

It is also possible to use a belt drum 5 unturnably mounted with reference to the sprocket wheels 6, provided that care is taken, by means of the dimensioning of the drum 5 and the sprocket wheels with reference to each other, that the load imposed by the drum 5 on the belt 1 remains very small or non-existent. The drawback of this arrangement, compared with that of a freely rotatable drum 5, is that one is then confined to a given set of operating conditions as regards the material to be transported and the transportation angle, for which the dimensioning of the sprockets 6 and of the drum 5 has been carried out.

It is obvious that the belt drum 5 also may be carried on a shaft different from that of the sprocket wheels 6, and it may also be arranged to be lightly driven; but in practice the last-mentioned is completely unnecessary because the transporting force generated by the material to be transported is distributed over the whole length of one side of the belt and is therefore locally very small, while the transporting force from the driving roll acts locally on a very small part of the belt. It follows that it is most advantageous in all instances to arrange the belt to receive its principal transport force from the material to be transported.

I claim:
1. An endless belt conveyor for transporting material comprising
   a stationary sliding base having a smooth upper surface,
   a shaft,
   sprocket wheels secured to said shaft for rotation therewith,
   a drum mounted for free rotation on said shaft between said sprocket wheels,
   an endless belt having one run thereof supported on said stationary sliding base and trained about said drum,
   parallel spaced chains driven by said sprocket wheels and a plurality of transversal conveying means fixed between said chains for movement thereon moving over said one run;
   and driving means operatively connected to said chain conveyor;
   the material to be transported being carried on the endless belt with its weight supported by the stationary sliding base and said endless belt being carried along by the material being transported.

* * * * *